Feb. 10, 1959            H. THOMA            2,872,827
CONTROL MEANS FOR INFINITELY VARIABLE TRANSMISSIONS
Filed April 19, 1956            2 Sheets-Sheet 1
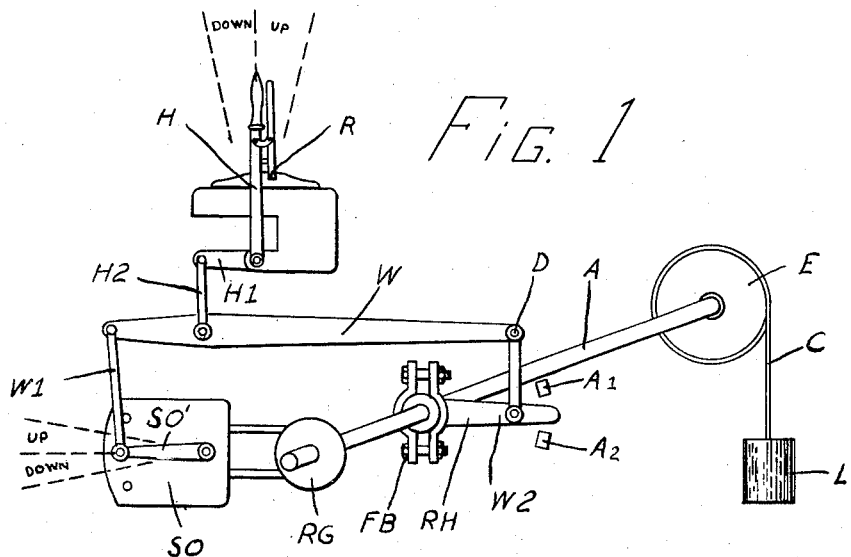
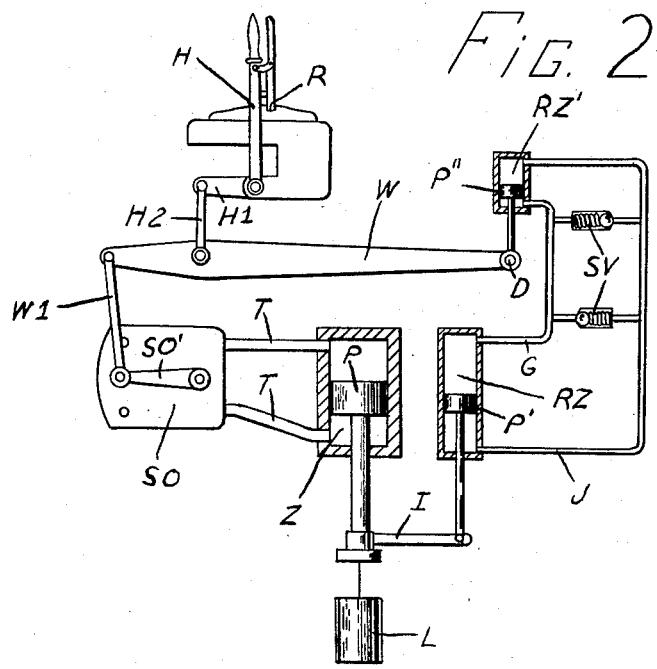
Hans Thoma INVENTOR.
BY Allen A. Klicke Hans Thoma INVENTOR.

BY Allen A. Hicks

United States Patent Office 2,872,827
Patented Feb. 10, 1959

2,872,827
CONTROL MEANS FOR INFINITELY VARIABLE TRANSMISSIONS

Hans Thoma, Zurich, Switzerland

Application April 19, 1956, Serial No. 579,381

9 Claims. (Cl. 74—335)

This invention relates to control means for infinitely variable transmissions and has for an object to provide control means for such transmissions which when manually adjusted away from zero position provides a speed control for the output member of the transmission and when moved to the zero position provides a position control.

In many types of infinitely variable transmissions which may be adjusted down to zero or, in some cases, reversed, such as electrical Leonard drives, hydrostatic transmissions and also some types of friction drives, it is desirable to cause the output shaft to stand still although the input shaft is rotating. In the case of a Leonard drive, this is effected through varying the excitation of the Leonard dynamo; with hydrostatic drives through the adjustment of the piston stroke of one unit or through a reversing valve; and in the case of a friction drive consisting of an output friction wheel and input friction disk by moving the output friction wheel to the center of the input friction disk. Such devices are often used in cases where the output shaft is loaded as, for example, through the suspended weight of a hoisting crane.

In all of these cases, there is the difficulty that the setting to zero output speed of the output shaft is uncertain or inexact so that even with well made adjusting means a very slow movement of the output shaft forward or rearward takes place and, in the case of a hoist, sinking of the load is difficult to avoid. In the case of a hoist of the type mentioned, the suspended heavy weight sinks gradually even when the control lever is moved to zero, for example, by justifying the adjustment by a detent so constructed as to hold a normal load from sinking. However, with the same setting, when the lifting gear is not loaded it will rise, which is just as objectionable as sinking when overloaded.

This is caused because all such drives have a certain amount of slip, namely that for a certain setting of the control lever, the output speed is a function of the load even though the input shaft is driven with unchanged speed. In the case of the Leonard drive, this slip depends, for example, upon the copper resistance of the circuit. In the case of friction drives, a so-called boring friction occurs which shifts its position according to the load. In the case of hydrostatic hydraulic drives, the slip is caused mostly by linkage which is dependent upon the temperature just as is the electrical resistance in the case of the Leonard drive. In the case of friction drives, the location of the friction contact is dependent on temperature and load and therefore causes a variation of slip.

In all drives of this type with infinitely variable transmissions, one cannot depend upon locating the control lever in a definite notch to cause the output shaft to actually stand still. It was, therefore, necessary usually to provide a special mechanical brake for this purpose which is activated when the control lever is moved into the zero position and causes the output shaft to be held fast by mechanical braking. In order to avoid the working of the brake and the transmission against each other, it was also necessary to combine this brake with some means for disconnecting the control of the transmission; for example, by interrupting the current in a Leonard drive or a valve which takes pressure off of the main conduits of the hydrostatic drive or at least to bring it and the conduits to equal pressure.

The latter constructions are not only very complicated but due to their variable action cause a hunting or indefiniteness in the output speed which is then more objectionable since in many cases, for example, with an assembling crane, the location of the load must often be justified very accurately.

In accordance with the invention, these difficulties of the known speed controls of adjustable transmissions are removed thereby that while retaining the principle of the speed control there is added a position control effective in a limited range adjacent to the null position of the control lever. By providing stops which limit the movement of thte feed-back mechanism and using friction contact in the case of a mechanical feed-back or through pressure limiting valves in the case of an hydraulic feed-back, it is possible to cause the position control to be effective in a limited range near the zero adjustment and on the other hand is not affected by the larger adjustment movements which determine the speed control.

It is therefore another object to provide such control means having abutment means with relation to which the manually operated control means and/or connecting means actuated thereby are moved, which connecting means actuates the speed control means of the transmission, together with intermediate means between said abutment means and said speed control means, actuated to a limited extent by movement of the output means of the transmission, when the manually operated means is set to zero position, in such a direction as to stop the motion of said output means.

It is a more specific object to provide such control means in which the intermediate means is frictionally connected to the output means of the transmission, whereby, when the manually operated means is set to zero position, any movement of the output means of the transmission causes said intermediate means to operate the speed control means of the transmission in such a direction as to stop the motion of said output means.

Another object is to provide such control means in which the speed control means of said transmission is actuated to a limited extent by hydraulic means which hydraulic means are controlled by any movement of the output means of the transmission when the manually operated means is set to zero position.

Another object is to provide such control means in which the speed control means of said transmission is actuated to a limited extent by electromagnetic means which electromagnetic means are controlled by any movement of the output means of the transmission when the manually operated means is set to zero position.

Further objects and advantages of this invention will be apparent from consideration of the specification as illustrated by the accompanying drawings of possible embodiments of the invention, in which drawings:

Fig. 1 shows more or less schematically one form the invention may take in which the control means of the transmission are operated to a limited extent by a friction drive from the output shaft of the transmission;

Fig. 2 shows more or less schematically a modified form in which the control means of the transmission are operated to a limited extent by hydraulic means controlled from the output member of the transmission;

Figure 3:
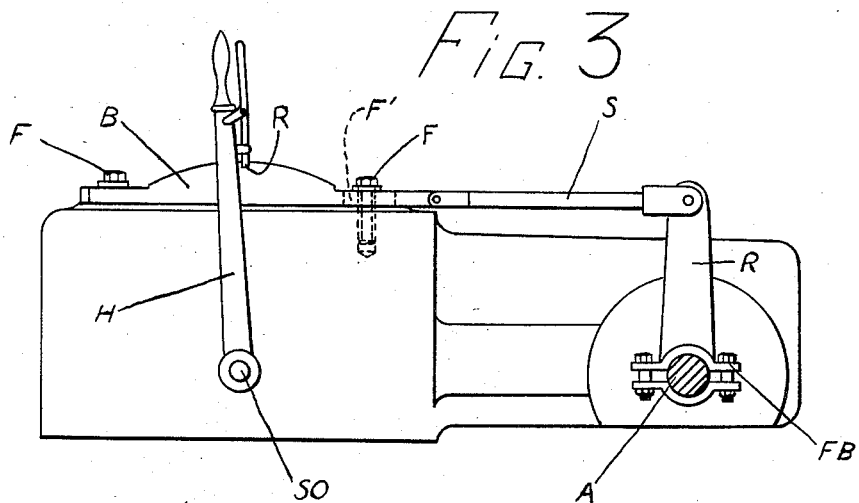
Fig. 3 is an elevation of a further form of construction employing friction means.

Referring to said drawings, H indicates a manually operated control handle which may be moved by the operator forward or rearwardly from the neutral position shown in Figs. 1, 2 and 3. Said handle H is connected by suitable means to the control organ or member SO of a transmission unit RG. In the case of an hydraulic transmission, the member SO may be an infinitely variable hydraulic pump capable of delivering fluid in volumes varying from zero to a maximum in either direction and the member RG of Fig. 1 will in that event comprise an hydraulic motor actuated by fluid from the pump SO.

In the form shown in Fig. 1, the handle H is connected to an arm H1 connected by a link H2 to a lever W, one end of which is connected by link W1 to the control lever SO' of the organ SO. The other end of said lever W is pivoted at D to a link W2 pivotally connected to an arm RH bearing frictionally upon the output shaft A of the transmission, it being pressed against such shaft by means of a clamping member FB. Stops A1 and A2 serve to limit the oscillation of arm RH. E may represent a winding drum, attached to output shaft A, receiving a cable C supporting a load L.

If the operator moves handle H in a certain direction away from the notch R, which represents the zero position, the shaft A will rotate at a speed dependent upon the distance the handle H is moved from said zero position thus providing a speed control for the output shaft A of the transmission. The direction of rotation depends upon the direction of movement of the handle H from its zero position. Such rotation of shaft A will cause the frictionally driven arm RH to move against one of the stops A1 or A2. Such motion will subtract some of the effect of the movement of handle H but this effect is easily corrected by further movement of handle H. Thus, means are provided for causing the load L to be lifted or lowered at a speed determined by the setting of handle H.

If, now, the handle H is moved to and fixed in its middle position by engagement of a latch in notch R, the lever SO' of the control organ will obviously be moved to or near its central position whereby the output shaft A is brought to stand still or moves at an extremely slow speed, depending upon the location of the point D whereby a slow, up or down, movement is imparted to the load L. Such further movement of load L and shaft A causes movement of arm RH in such a direction as to adjust arm SO' to a position where the shaft A stands still or rotates in the opposite direction. Therefore, the shaft A soon stops turning, in spite of unavoidable inaccuracies in the proper location of handle H and the leakage which varies with the load L, with temperature and other factors. Therefore, while the handle H is held in its zero position, the control organ lever SO' is moved back and forth near its zero position through very small extents, with the result that the load L is held substantially stationary. The invention is not limited to the form of construction shown in Fig. 1. Thus, for example, the control organ SO may control an electric, hydraulic or mechanical variable drive transmission. Furthermore, the mechanical linkage shown in Fig. 1 may, for example, be replaced by hydraulic linkages such as shown in Fig. 2 in which a definite oil mass is enclosed by a piston fitting closely in a cylinder and serving to transmit movements in a manner analogous to mechanical linkages or levers. Such device is shown schematically in Fig. 2 in which the rotary hydraulic motor RG of Fig. 1 is replaced by an hydraulic cylinder Z within which operates a piston P connected to a suitable load L. The spaces above and below the piston are connected through tubes T with a source of hydraulic pressure such as the organ SO. Mechanically connected with the piston P as through arm I is a piston P' operating in cylinder RZ. The space above the piston P' is shown connected by tube G with the space below P" located in cylinder RZ' and the space below piston P' is connected by tube J with the space above the piston P". Relief valves SV are connected between the tubes G and J, each permitting flow in one direction whenever the pressure difference exceeds a certain value. The operation of the form of construction shown in Fig. 2 is generally similar to that shown in Fig. 1. The piston P and load L are moved at a speed dependent upon the extent of movement of handle H from its zero position, the direction of movement being determined by the direction of movement of the handle H from its zero position. If, now, the handle H is moved to its zero position, movement of piston P will stop or almost stop. If, however, piston P moves due to inaccuracy of the position of handle H or due to fluid leakage or the like, its motion will cause piston P to move which in turn causes P' to move. This displaces fluid which causes piston P" to move lever W and therefore the control lever SO' in such a manner as to stop movement of piston P. It will be noted that no stops to limit the motion of lever W are shown. This function may be provided by the piston P" engaging the ends of cylinder RZ'.

Figure 4:
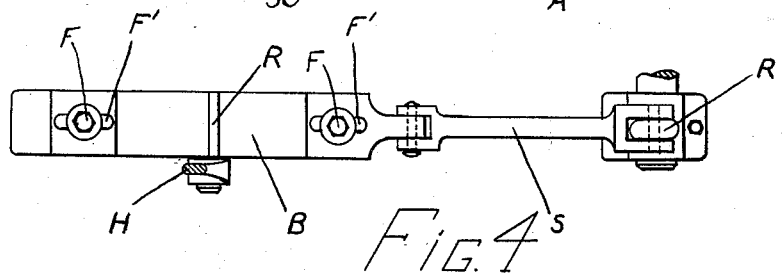
Fig. 4 is a plan view of part of the device shown in Fig. 3.

Figs. 3 and 4 show another form of the invention. Instead of providing an intermediate variable connection between the handle H and the control organ SO, handle H is connected directly thereto and the zero position notch R is adjusted by movement of the shaft A acting frictionally upon arm R which through link S shifts the plate B which carries notch R and therefore the handle H. Plate B is mounted by means of bolts F passing through slots F' in the plate B.

Figure 5:
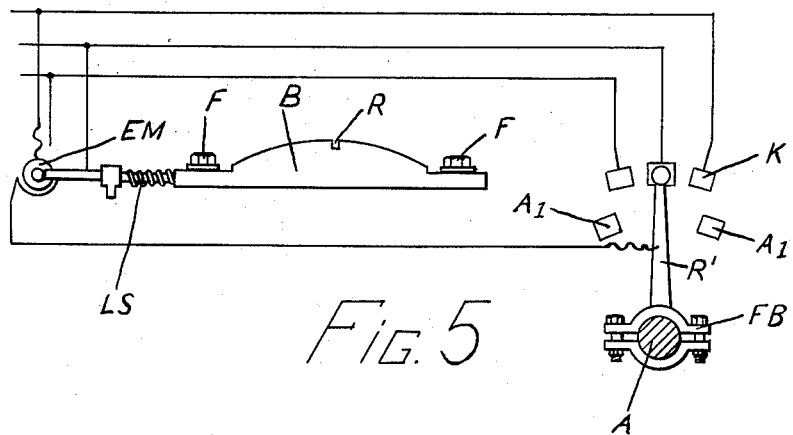
Fig. 5 shows more or less schematically a modified form in which the control means of the transmission are operated by electromagnetic means controlled by friction means operated by the output shaft of the transmission.

Fig. 5 shows a further modification similar to that of Figs. 3 and 4. In this case, an arm R' is frictionally oscillated by shaft A between stops A1. Said arm carries a contact which may engage one of the stationary contacts K which serve to control rotation of an electric motor EM which through a lead screw LS shifts the plate B. As in Figs. 3 and 4, this adjusts the position of notch R and therefore of the handle H to bring the transmission output member A to standstill. The invention may also be employed in other types of apparatus such as in an hydraulic press to prevent the undesired creep movement of the press piston when the press is not in operation.

It will be noted that the constructions shown and described will serve admirably to accomplish the objects stated above. It is to be understood, however, that the constructions disclosed above are intended merely as illustrative of the invention and not as limiting as various modifications therein may be made without departing from the invention as defined by a proper interpretation of the claims which follow:

I claim:

1. Control means for infinitely variable power transmissions which have power input means and power output means and a control organ to adjust the drive ratio of said transmission from zero to a maximum in either direction, said control means comprising a manually operated member and connections therefrom to said control organ so constituted and arranged that said manually operated member causes said control organ to control the transmission for substantially zero drive ratio when the manually operated member is in an intermediate position and to cause the control organ to control the transmission for gradually increasing drive ratio as the manually operated member is moved away from said intermediate position, the direction of movement of said output member being determined by the direction of movement of said manually operated means from its zero position, together with supplemental control means for said control organ, effective when said manually operated member is in zero position, so operated by the output means of said transmission that upon the occurrence of any movement of said output means while the manually operated member is in zero position the control organ will be adjusted in a direction to terminate such motion of the output means, and to cause the output means to return to the position it occupied when said manually operated member was placed in the zero position.

2. Control means for infinitely variable power transmissions which have power input means and power output means and a control organ to adjust the drive ratio of said transmission from zero to a maximum in either direction, said control means comprising a manually operated member and connections therefrom to said control organ so constituted and arranged that said manually operated member causes said control organ to control the transmission for substantially zero drive ratio when the manually operated member is in an intermediate position and to cause the control organ to control the transmission for gradually increasing drive ratio as the manually operated member is moved away from said intermediate position, the direction of movement of said output member being determined by the direction of movement of said manually operated means from its zero position, together with supplemental control means for said control organ, effective when said manually operated member is in zero position, so operated by the output means of said transmission that upon the occurrence of any movement of said output means while the manually operated member is in zero position the control organ will be adjusted in a direction to terminate such motion of the output means and to cause the output means to return to the position it occupied when said manually operated member was placed in the zero position, said supplemental control means being yieldingly driven by said output means in either direction to an extent limited by stops.

3. Control means for infinitely variable power transmissions which have power input means and a power output shaft and a control organ to adjust the drive ratio of said transmission from zero to a maximum in either direction, said control means comprising a manually operated member and connections therefrom to said control organ so constituted and arranged that said manually operated member causes said control organ to control the transmission for substantially zero drive ratio when the manually operated member is in an intermediate position and to cause the control organ to control the transmission for gradually increasing drive ratio as the manually operated member is moved away from said intermediate position, the direction of rotation of said output shaft being determined by the direction of movement of said manually operated means from its zero position, together with supplemental control means for said control organ, effective when said manually operated member is in zero position, so operated by the output shaft of said transmission that upon the occurrence of any movement of said output shaft while the manually operated member is in zero position the control organ will be adjusted in a direction to terminate such motion of the output shaft and to cause the output means to return to the position it occupied when said manually operated member was placed in the zero position, said supplemental control means being frictionally yieldingly driven by said output shaft in either direction to an extent limited by stops.

4. Control means for infinitely variable power transmissions which have power input means and power output means and a control organ to adjust the drive ratio of said transmission from zero to a maximum in either direction, said control means comprising a manually operated member and connections therefrom to said control organ so constituted and arranged that movement of said manually operated member causes said control organ to control the transmission for substantially zero drive ratio when the manually operated member is in an intermediate position and to cause the control organ to control the transmission for gradually increasing drive ratio as the manually operated member is moved away from said intermediate position, the direction of movement of said output member being determined by the direction of movement of said manually operated means from its zero position, together with supplemental control means for said control organ, effective when said manually operated member is in zero position, so operated by the output means of said transmission that upon the occurrence of any movement of said output means while the manually operated member is in zero position the control organ will be adjusted in a direction to terminate such motion of the output means and to cause the output means to return to the position it occupied when said manually operated member was placed in the zero position, said supplemental control means comprising a hydrostatic transmitter operated by the output means and a hydrostatic motor element operated by fluid from said hydrostatic transmitter together with stop means to limit the movement of said hydrostatic motor.

5. Control means for infinitely variable power transmissions which have power input means and power output means and a control organ to adjust the drive ratio of said transmission from zero to a maximum in either direction, said control means comprising a manually operated member and connections therefrom to said control organ so constituted and arranged that movement of said manually operated member causes said control organ to control the transmission for substantially zero drive ratio when the manually operated member is in an intermediate position and to cause the control organ to control the transmission for gradually increasing drive ratio as the manually operated member is moved away from said intermediate position, the direction of movement of said output member being determined by the direction of movement of said manually operated means from its zero position, together with supplemental control means for said control organ, effective when said manually operated member is in zero position, so operated by the output means of said transmission that upon the occurrence of any movement of said output means while the manually operated member is in zero position the control organ will be adjusted in a direction to terminate such motion of the output means and to cause the output means to return to the position it occupied when said manually operated member was placed in the zero position, said supplemental control means comprising a hydrostatic transmitter operated by the output means and a hydrostatic motor element operated by fluid from said hydrostatic transmitter together with stop means to limit the movement of said hydrostatic motor, together with relief valve means connected between said transmitter and motor to bypass fluid when a predetermined pressure difference occurs, whereby the output means may partake of a substantial movement while moving the supplemental control means to an extent limited by said stop means.

6. Control means for infinitely variable power transmissions which have power input means and power output means and a control organ to adjust the drive ratio of said transmission from zero to a maximum in either direction, said control means comprising a manually operated member and connections therefrom to said control organ so constituted and arranged that said manually operated member causes said control organ to control the transmission for substantially zero drive ratio when the manually operated member is in an intermediate position and to cause the control organ to control the transmission for gradually increasing drive ratio as the manually operated member is moved away from said intermediate position, the direction of movement of said output member being determined by the direction of movement of said manually operated means from its zero position, together with supplemental control means for said control organ, effective when said manually operated member is in zero position, so operated by the output means of said transmission that upon the occurrence of any movement of said output means while the manually operated member is in zero position the control organ will be adjusted in a direction to terminate such motion of the output means and to cause the output means to return to the position it occupied when said manually operated member was placed in the zero position, said supplemental control means being connected between said manually operated means and said control organ.

7. Control means for infinitely variable power transmissions which have power input means and power output means and a control organ to adjust the drive ratio of said transmission from zero to a maximum in either direction, said control means comprising a manually operated member and connections therefrom to said control organ so constituted and arranged that said manually operated member causes said control organ to control the transmission for substantially zero drive ratio when the manually operated member is in an intermediate position and to cause the control organ to control the transmission for gradually increasing drive ratio as the manually operated member is moved away from said intermediate position, the direction of movement of said output member being determined by the direction of movement of said manually operated means from its zero position, together with supplemental control means for said control organ, effective when said manually operated member is in zero position, so operated by the output means of said transmission that upon the occurrence of any movement of said output means while the manually operated member is in zero position the control organ will be adjusted in a direction to terminate such motion of the output means and to cause the output means to return to the position it occupied when said manually operated member was placed in the zero position, said supplemental control means being connected to adjust the position of said manually operated member.

8. Control means for infinitely variable power transmissions which have power input means and power output means and a control organ to adjust the drive ratio of said transmission from zero to a maximum in either direction, said control means comprising a manually operated member and connections therefrom to said control organ so constituted and arranged that said manually operated member causes said control organ to control the transmission for substantially zero drive ratio when the manually operated member is in an intermediate position and to cause the control organ to control the transmission for gradually increasing drive ratio as the manually operated member is moved away from said intermediate position, the direction of movement of said output member being determined by the direction of movement of said manually operated means from its zero position, together with supplemental control means for said control organ, effective when said manually operated member is in zero position, so operated by the output means of said transmission that upon the occurrence of any movement of said output means while the manually operated member is in zero position the control organ will be adjusted in a direction to terminate such motion of the output means and to cause the output means to return to the position it occupied when said manually operated member was placed in the zero position, said supplemental control means comprising hydraulic means actuated by the output member.

9. Control means for infinitely variable power transmissions which have power input means and power output means and a control organ to adjust the drive ratio of said transmission from zero to a maximum in either direction, said control means comprising a manually operated member and connections therefrom to said control organ so constituted and arranged that said manually operated member causes said control organ to control the transmission for substantially zero drive ratio when the manually operated member is in an intermediate position and to cause the control organ to control the transmission for gradually increasing drive ratio as the manually operated member is moved away from said intermediate position, the direction of movement of said output member being determined by the direction of movement of said manually operated means from its zero position, together with supplemental control means for said control organ, effective when said manually operated member is in zero position, so operated by the output means of said transmission that upon the occurrence of any movement of said output means while the manually operated member is in zero position the control organ will be adjusted in a direction to terminate such motion of the output means and to cause the output means to return to the position it occupied when said manually operated member was placed in the zero position, said supplemental control means comprising electromagnetic means controlled by movement of the output member.

References Cited in the file of this patent
UNITED STATES PATENTS

| 2,695,145 | Lear et al. | Nov. 23, 1954 |
| 2,717,344 | Jackson | Sept. 6, 1955 |